United States Patent Office 2,963,259
Patented Dec. 6, 1960

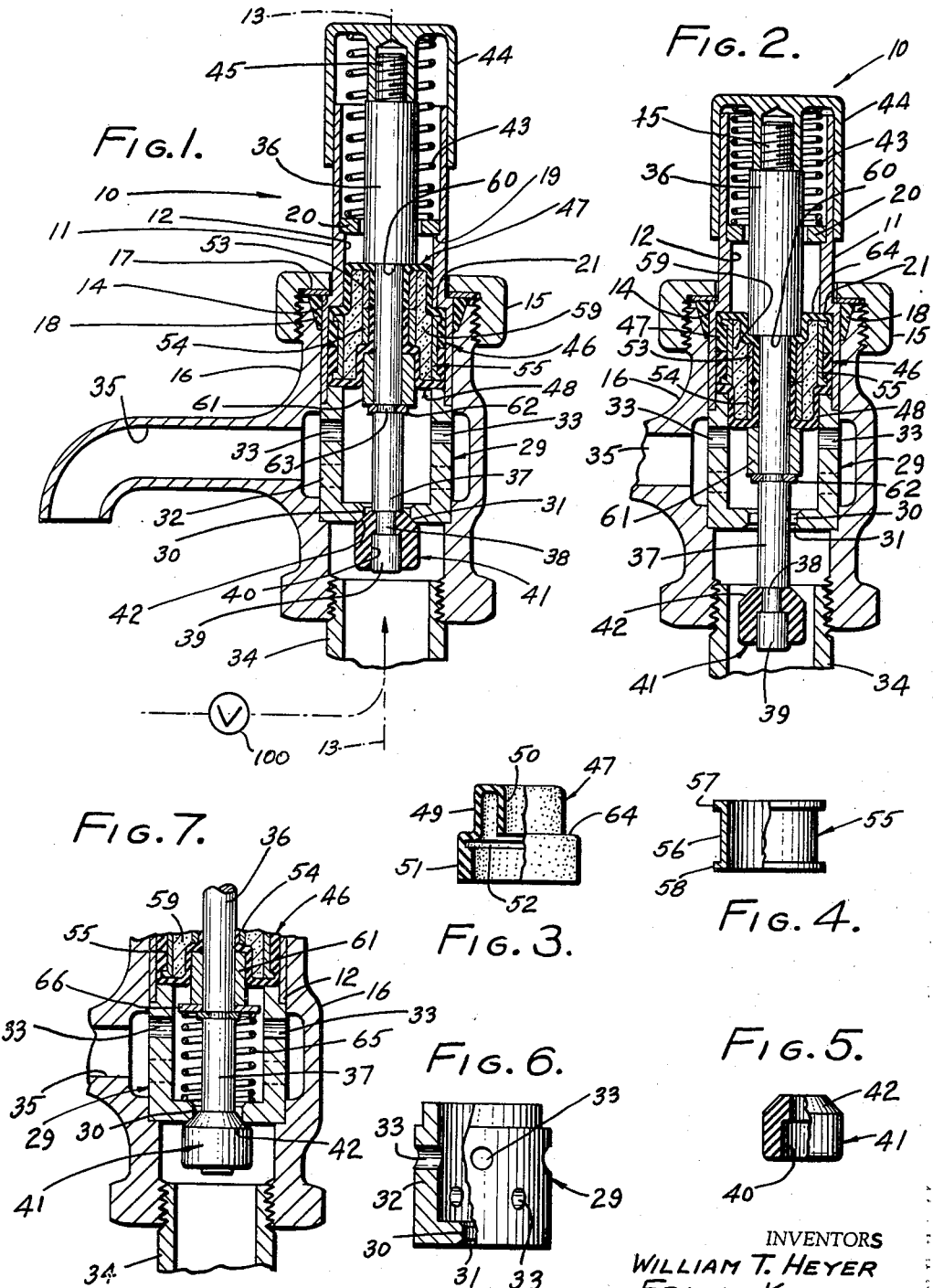

2,963,259
METERING VALVE

William T. Heyer, 411 N. Wilson, Pasadena, Calif., and Frank Kepka, 2995 N. Lake Ave., Altadena, Calif.

Filed Sept. 9, 1957, Ser. No. 682,739

10 Claims. (Cl. 251—48)

This invention relates to a metering valve intended for discharging a predetermined volume of liquid on each actuation thereof.

Metering valves such as for water closet faucets are well known, and have for their principal object the discharge of a limited and predetermined volume of water upon each actuation of the valve.

A disadvantage inherent in most of the presently known devices of this type resides in the fact that their metering means ordinarily require a bleed action in which fluid is forced from one chamber to another, commonly by such means as the flow of water under pressure from the water line into a cylinder which moves a piston to shut off the valve. Valves utilizing bleed means are inherently unreliable, principally because the bleed means frequently become plugged up, or otherwise change in size. Also, they are undesirably complex, and need to be kept in close adjustment if they are to work correctly.

Accordingly, an object of this invention is to provide a metering valve in which means are provided for delaying the closing of the valve, which means are entirely isolated from the fluid being discharged, which do not discharge any material whatever during their controlling operation, and which do not rely on restrictor passages for their closure-delaying function.

A valve according to this invention incorporates a housing having a passage, and a spindle disposed in said passage so that the housing and spindle are relatively reciprocable. The spindle carries a plug which is adapted to close a port in said housing. When the spindle is in one position, the plug closes the port to shut off the valve, and when the spindle is displaced from such position the plug is removed from the said port so that water can flow through said valve. A flexible, deformable capsule is interconnected between the housing and the spindle so as to be deformed when the spindle is axially shifted relative to the housing. In order for the spindle to move the plug back in a position to close the valve, the capsule must simultaneously be restored to its former condition. This process of restoration delays the shutting off, and the capsule is subject to design in various sizes to give various delays.

The above and other features of this invention will be fully understood from the following detailed description and the accompanying drawings, of which:

Fig. 1 is a side view, partly in cross-section of the preferred embodiment of a valve according to the invention, shown with the valve closed;

Fig. 2 is a fragmentary view, partly in cross-section, of the valve of Fig. 1, shown with the valve open;

Figs. 3–6 are side elevations, partly in cross-section of component parts of the valve of Fig. 1; and Fig. 7 is a fragmentary side view, partly in cross-section, of a modification of the valve of Fig. 1.

A metering valve 10 according to this invention is shown in Fig. 1. The valve includes a housing 11 which has a central passage 12 with an axis 13. The housing has an outer shoulder 14 to restrain an attachment ring 15 which threads on to a faucet base 16 holding a spacer 17 and a rubber washer 18 therebetween. Within the housing there is an undercut ring groove 19 for receiving a retaining ring 20. There is also an inner shoulder 21 on said housing for bearing against a capsule to be described.

A seat member 29 is generally cylindrical in shape and has an axis coinciding with axis 13. On this axis there is a circular port 30 defined by a circular seat 31 which may be chamfered as shown. This seat member has a cylindrical wall 32 which is pierced by a plurality of flow holes 33 by means of which, when the metering valve is attached to a faucet as shown, water or other fluid can flow from a pipe 34 through the port 30 and out flow holes 33 through a faucet pipe 35 when the port is opened.

Within the central passage 12, and coaxial with the axis 13, there is an axially reciprocable spindle 36. This spindle has a portion 37 which passes through the port 30 so as to project on the opposite side of said port from the flow holes. This portion has a groove 38 which creates a cylindrical attachment means 39 which fits into a matching cavity 40 in a plug 41. This plug is tapered as at 42, and as can be seen from the figures, the plug will in one position of the spindle (shown in Fig. 1), close the port so that there can be no fluid flow from pipe 34 to the valve, and in another position (shown in Fig. 2), open the port. Water pressure in pipe 34 aids in maintaining this seal.

Spring means 43 are biased between the retaining ring 20 and the cap 44. The cap is threaded onto threads 45 on the spindle. The spindle is thereby biased to the valve-closed position shown in Fig. 1.

It will be appreciated that when the cap 44 is pressed down, the spindle will be moved to a position in which the plug 41 is removed from the port 30 and water flow is permitted. Even without the spring means, water pressure in the seal member and pipe will tend to ultimately return the spindle in the valve-closed position. However, the spring means 43 provides a more predictable rate of return than is obtainable through water pressure alone, because water pressure is subject to fluctuation, while the spring pressure is not. By making the effect of the spring several times greater than the effect of water pressure in closing the valve, relatively large pressure changes will have a relatively lesser effect on the length of the valve's closing cycle, thereby providing a valve which gives about the same time delay in closing of the valve over a wide range of pressure values.

In order to provide for a sufficiently long valve closing time for the desired volume of water to flow through the valve for each actuation, shear means 46 are connected between the housing and the spindle so as to join the same and retard the relative motion of the two components. Shear means 46 comprises a flexible, deformable capsule, the components of which are shown in Figs. 2, 3 and 4. Principally this capsule is formed by a pair of caps 47, 48, cap 47 being shown in Fig. 3. Cap 48 is of identical construction. Cap 47 has a bell-shaped portion 49 (sometimes called a "web section" in the sense that it is this bell-shaped portion which is the interconnection of the cap between the body of the valve and the spindle) terminating at its portion of narrowest diameter with a depending internal neck portion 50 which is generally cylindrical in shape. The larger end of the bell-shaped portion adjoins a cylindrical section 51. Inside this cylindrical section there is an undercut groove 52 for retention purposes to be described below.

A pair of first cylindrical rings 53, 54 have an inner diameter which is equal to the diameter of the spindle plus twice the thickness of the annular part of the neck portion 50, so that the said first rings can be fitted over the depending internal neck portions as shown to hold neck portions against the spindle. When the caps are put upon the spindle, the neck portions bear against each other as do the rings 53, 54.

A second ring 55 (see Fig. 4) has a central cylindrical portion 56 bounded on either side by an enlarged shoulder 57, 58. When the caps are installed, the enlarged shoulders fit into the undercut grooves 52, thereby retaining the caps on ring 55 and sealing the capsule. The housing makes a snug fit over the outside of the cylindrical sections 51 so that the cap is held firmly between ring 55 and the housing. The capsule is thus joined to both the spindle and to the housing. A quantity of viscous fluid 59 is placed inside the caps just before they are snapped over the second ring 55, and a preferred fluid for this purpose is a liquid silicone having a viscosity in the temperature range of 0–100° C. of about 6,000 centistokes.

It will be observed that the first rings 53 and 54 have a cylindrical outer surface having a diameter, and that the second ring 55 has a cylindrical inner surface with a diameter greater than that of the first ring. The space between the said rings and within the bounding webs forms a single chamber which is filled with a viscous fluid. The term "single chamber" defines an interior of a capsule in which a single region maintains substantially the same volume throughout the operation of the valve even though its shape may change somewhat. The term is intended to exclude such structures as are shown in Heldrich Patent 1,304,311, which discloses a capsule with a restrictor-type barrier that divides the capsule into two chambers. The restriction to movement is derived, in Heldrich, from fluid flowing through restrictor ports, from one chamber to the other (the chambers changing volume), rather than being derived from the shear properties of the viscous fluid itself. In the instant invention, the spacing apart of the rings, and the length of the capsule are two of the determinants which determine the resistance offered by the viscous fluid in the capsule to the relative movement between the housing and the spindle. The viscosity of the fluid 59 is another determinant. One of the benefits of utilizing a viscous fluid such as the aforesaid silicone is that the said silicone does not show an appreciable change in viscosity within ordinary operating ranges of hot water faucets. Then, regardless of the temperature of the water and of the faucet, a quite consistent control over volume of flow (as a function of the length of time which the valve is opened) per actuation is maintained.

The narrow end of the neck portion of cap 47 is backed up by a shoulder 60 on the spindle. The like end of cap 48 is backed up by a sleeve 61 held in place by a snap ring 62 seated in a groove 63 on the spindle. Both caps have a shoulder portion 64. This portion of cap 47 is backed up by inner shoulder 21 in the housing, and the corresponding portion of cap 48 is backed up by the upper end of seat member 29. It will be seen that the central part of the bell-shaped portions 49 is what flexes when the spindle and housing move relative to each other.

In Fig. 7 there is shown another embodiment of this invention in which a spring 65 is placed inside the seat member, where it is opposed between the seat member and a shoulder 66 on the spindle. This biases the spindle to a valve-closed position. This figure illustrates that the bias spring can be located in various places in the valve. However, it is somewhat more advantageous to have the spring outside the water as shown in Fig. 1, as this reduces corrosion problems.

Significant dimensions for construction of a valve which passes approximately two quarts of water per actuation are as follows:

Outer diameter of rings 47 and 48, 0.406 in.
Inner diameter of ring 55, 0.437 in.
Bias spring: stainless steel, 0.029 wire wound 5 turns to the inch, free length 1 5/16, outer diameter 0.481 in.

The capsule is filled with the aforesaid silicone damping fluid. If the clearance between the rings were increased, the time the valve remains open would be lessened, and if the clearance is reduced, the time is lengthened.

The operation of this valve should be evident from the drawings. To open the valve and release a predetermined volume of liquid as a function of the time which the valve is open, cap 44 is pressed down, thereby moving the spindle to unseat the plug. When the cap is released, the bias spring and the pressure of the water flowing into the seat member tend to restore the spindle to its original position wherein the plug closes port 30. This return movement is resisted by viscous (or shear) forces within the capsule, and these forces, of course, will be overcome by work done by the spring and by the water. The amount of time necessary to create this return movement is quite consistent from operation to operation, and therefore so is the volume passed by the faucet.

The action in the capsule which results from relative movement between the spindle and the interior wall of the passage will now be further explained. It is evident that the volume of the capsule remains practically constant. It is also evident that the capsule as a whole moves relative to both the spindle and the wall of the passage when the spindle moves axially in the passage. This movement of the capsule is something like trying to turn a rubber ring "inside out," that is, it is a rolling action around a circle that is centered on the center of the ring. The movement of the spindle causes the change in configuration of the cross-sections of the caps in planes which include the axis of the spindle. For example, when the spindle moves down to open the valve part of the web of cap 48, it is removed from contact with the wall, and another part is laid against the spindle. Thus, the capsule as a whole has moved relative to both the spindle and the wall.

The drawings indicate that at many relative positions the spindle may assume relative to the wall, and additional incremental shift will move fluid from an annular space in one cap, and shift an equal volume of fluid to an annular space in the other cap which may be nearer to or farther from the central axis, and thus have a different volume per incremental unit of axial length. Because the fluid that fills the capsule does not change in volume, the inner volume does not change. The flexibility of the web enables the capsule to change the axial length of the capsule enough to maintain a constant volume with the new shape.

The seating of the plug in port 30 is made more positive by the water pressure in the pipe due to the fact that the water pressure forces the plug against the said port when the valve is closed.

This invention thereby provides a desirable and reliable metering valve which opens the valve for a predictable time and thus delivers a predictable volume of water which varies little with temperature changes, and which delivering time varies only slightly with pressure changes. The term "metering" or "metered quantity" as used herein relates to the amount of flow which is passed by the valve during the time which it is open. The quantity will, of course, vary between liquids of different viscosity and between samples of the same liquid at different temperatures when the viscosity of the flowing liquid varies with temperature. Accordingly, this metering valve acts as such in the sense that it is a valve which remains open for a pre-determined length of time.

Supply water line pressures often vary from 10 to 100 p.s.i. A fully open faucet with high pressures would cause severe and unwanted splash in lavatories. For this reason a line restriction such as a shut off valve 100 under the lavatory is often desirable because it can be regulated so that only about 2-3 p.s.i. flows through the faucet. With such a restriction the flow and timing features of this invention are made even more dependable.

This invention is not to be limited by the embodiments shown in the drawings and described in the description, which are given by way of example and not of limitation, but only in accordance with the scope of the appended claims.

We claim:

1. A metering valve comprising: a housing, an interior wall in said housing defining a passage, said passage having an axis; a spindle disposed in said passage and axially reciprocable along said axis; a tubular seat member in abutment with said housing and having an axis co-linear with the passage axis, said seat member having a cavity, an axial port defined by a seat, and flow holes through the wall of said seat member, said port and flow holes being connected through the cavity, said spindle passing through and projecting beyond said port so as to have a projecting portion on the opposite side of said port from the flow hole; a plug on said projecting portion, said plug being larger than the port and thereby being adapted to close said port in one axial position of the spindle, and to leave said port open in another axial position of said spindle; an annular elongated single-chambered capsule in said passage attached to, extending between, and interconnecting the spindle and the interior wall, said capsule comprising a pair of flexible caps fitted over said spindle so as to enclose a space between them, a first ring holding said caps to the spindle, said ring having an outer diameter, a second ring having an inner diameter greater than said outer diameter coaxially disposed around said first ring, said second ring holding the caps against the housing, the housing enclosing said caps, the space within said caps being filled with a viscous fluid, relative axial movement between the spindle and the interior wall causing the configuration of the cross-sections of the caps to change in planes which include the axis of the spindle, so that parts of the capsule move relatively to both the spindle and the interior wall as the spindle moves axially relative to the interior wall, the cross-section of said capsule chamber in planes normal to the spindle axis, and the degree of viscosity of said fluid being so related as to create shearing forces in the fluid upon axial movement of said spindle relative to the wall, thereby to retard closing movement of the plug, imparting axial movement of the spindle toward said port removing the plug therefrom to permit liquid to flow into said port and out of said holes, and return movement of said spindle causing said plug to close off said port.

2. A metering valve according to claim 1 in which spring means are placed in opposition between said housing and said spindle which tend to move the spindle so that the plug closes the port.

3. A metering valve according to claim 1 in which the viscous fluid is a silicone.

4. A metering valve comprising: a housing, an interior wall in the housing defining a passage, said passage having an axis; a spindle disposed in said passage so as to be axially reciprocable along said axis; a tubular seat member in abutment with said housing and having an axis colinear with the passage axis, said seat member having a cavity, an axial port defined by a seat, and flow holes through the wall of said seat members, said port and flow holes being connected through the cavity, said spindle passing through and projecting beyond said port so as to have a projecting portion on the opposite side of said port from the flow hole, the portion of the spindle which is reciprocable in said port being smaller than the port so as to leave a peripheral space between the spindle and the port; an internal shoulder on said housing within the chamber and facing toward the seat member; a shoulder on the flow member within said chamber and facing toward the housing; a plug on the projecting portion of the spindle, said plug being larger than the port and thereby being adapted to close said port in one axial position of the spindle, and to leave said port open in another axial position of said spindle; a flexible capsule attached to and between said housing and said spindle, said capsule lying between and being in abutment with said two shoulders, said capsule comprising a pair of flexible caps fitted over said spindle so as to enclose a space between them, each of said caps having a web section adjoining to a re-entrant tubular portion therein, an external rim in abutment with one of said shoulders, a larger tubular portion, and an undercut groove within said tubular portion, a first ring holding said capsule to the spindle by being placed over the said depending tubular portion, said ring having an outer diameter, a second ring having an inner diameter greater than the said outer diameter and coaxially disposed around said first ring, a pair of outer annular shoulders on said second ring which project into the undercut groves in each of said caps so as to hold the caps together, the space within said caps forming an annular, elongated single chamber which is filled with a viscous fluid, relative axial movement between the spindle and the interior wall causing the configuration of the cross-sections of the caps to change in planes which include the axis of the spindle, so that parts of the capsule move relatively to both the spindle and the interior wall as the spindle moves axially relative to the interior wall, the cross-section of said capsule chamber in planes normal to the spindle axis, and the degree of viscosity of said fluid being so related as to create shearing forces in the fluid upon axial movement of said spindle relative to the interior wall, thereby to retard closing movement of the plug, imparting axial movement of the spindle toward said port removing the plug therefrom to permit liquid to flow into said port and out said holes, and return movement of said spindle causing said plug to close off said port.

5. A metering valve according to claim 4 in which the capsule is filled with a silicone fluid, and in which the seat member comprises a generally tubular structure having holes in the wall thereof and an end member in which the port and seat are formed.

6. A metering valve according to claim 5 in which the projecting portion of the spindle and the plug have mating portions for holding the plug to said portion.

7. A metering valve comprising: a housing, an interior wall in the housing defining a passage, said housing having an inlet, an outlet, and a port between said inlet and outlet, a spindle having an axis, said spindle being axially movable in said passage and having a portion which projects through said port; a plug on said portion which is larger than said port and adapted to close the port in one axial position of the spindle, and to leave the port open in another position of the spindle, and an annular, elongated single-chambered capsule in said passage attached to, extending between, and interconnecting the spindle and the interior wall, a pair of flexible web sections forming a part of the capsule, and extending between and interconnecting the spindle and said interior wall, said web sections being axially spaced apart from each other, the capsule being filled with a viscous fluid, relative axial movement between the spindle and the interior wall causing the configuration of the cross-sections of the web sections to change in planes which include the axis of the spindle, so that parts of the capsule move relatively to both the spindle and the interior wall as the spindle moves axially relative to the wall, the cross-section of said capsule chamber in planes normal to the spindle axis and the degree of viscosity of said fluid being so related as to create shearing forces in the fluid upon axial movement of said spindle relative to the wall, thereby to retard movement of the spindle and movement of the plug.

8. A metering valve according to claim 7 in which the capsule includes a pair of annular coaxial members, the larger of which has a cylindrical inner surface and the smaller of which has a cylindrical outer surface, said surfaces being spaced apart, the viscous fluid being disposed in said space and between the said web sections.

9. A metering valve according to claim 7 in which spring means bias the spindle so as to move the plug toward the port in order to close the same.

10. A metering valve according to claim 7 in which the viscous fluid is a silicone.

References Cited in the file of this patent

UNITED STATES PATENTS

| | | |
|---|---|---|
| 306,349 | Porter | Oct. 7, 1884 |
| 1,304,311 | Heldrich | May 20, 1919 |
| 1,856,664 | Steen | May 3, 1932 |
| 2,285,343 | Marchand | June 2, 1942 |
| 2,315,948 | Esnard | Apr. 6, 1943 |
| 2,552,479 | Copping | May 8, 1951 |
| 2,570,854 | Pierce | Oct. 9, 1951 |
| 2,816,569 | Heyer et al. | Dec. 17, 1957 |